United States Patent
Theisen

(10) Patent No.: US 7,376,502 B2
(45) Date of Patent: May 20, 2008

(54) DEVICE FOR TRIGGERING A RESTRAINING SYSTEM IN A VEHICLE

(75) Inventor: Marc Theisen, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/543,786

(22) PCT Filed: Oct. 18, 2003

(86) PCT No.: PCT/DE03/03502

§ 371 (c)(1),
(2), (4) Date: Feb. 7, 2006

(87) PCT Pub. No.: WO2004/069606

PCT Pub. Date: Aug. 19, 2004

(65) Prior Publication Data

US 2006/0235592 A1    Oct. 19, 2006

(30) Foreign Application Priority Data

Jan. 28, 2003    (DE) .................... 103 03 146

(51) Int. Cl.
*B60R 22/00* (2006.01)
*E05F 15/00* (2006.01)

(52) U.S. Cl. .............. 701/45; 180/274; 180/282; 280/735

(58) Field of Classification Search .......... 701/45; 180/274, 285, 282; 280/735
See application file for complete search history.

(56) References Cited

U.S. PATENT DOCUMENTS

| | | | |
|---|---|---|---|
| 6,907,335 B2 * | 6/2005 | Oswald et al. ............... 701/45 |
| 7,131,512 B2 * | 11/2006 | Aoki ............................ 180/271 |
| 2002/0013649 A1 * | 1/2002 | Anishetty et al. .............. 701/45 |
| 2002/0134607 A1 * | 9/2002 | Recknagel .................... 180/274 |
| 2003/0105569 A1 * | 6/2003 | Roelleke ....................... 701/45 |
| 2003/0114972 A1 * | 6/2003 | Takafuji et al. ............... 701/45 |
| 2004/0034458 A1 * | 2/2004 | Erb ................................ 701/45 |
| 2004/0117086 A1 * | 6/2004 | Rao et al. ...................... 701/36 |
| 2004/0256842 A1 * | 12/2004 | Breed ....................... 280/730.1 |
| 2005/0021192 A1 * | 1/2005 | Takafuji et al. ................ 701/1 |
| 2005/0192731 A1 * | 9/2005 | Eisele et al. .................. 707/45 |

FOREIGN PATENT DOCUMENTS

| | | |
|---|---|---|
| DE | 198 18 586 | 9/1999 |
| DE | 100 65 518 | 7/2002 |
| DE | 101 00 880 | 7/2002 |

OTHER PUBLICATIONS

Nsholz et al., "Vehicle Mass, Stiffness and their Relationship", SAE, Mar. 2004, pp. 1-10.*

* cited by examiner

*Primary Examiner*—Khoi H. Tran
*Assistant Examiner*—Brian J. Broadhead
(74) *Attorney, Agent, or Firm*—Kenyon & Kenyon LLP

(57) ABSTRACT

Proposed is a device for triggering a restraining system in a vehicle, the device triggering the restraining system as a function of a mass estimate of an impact object. In this context, the device is configured such that it performs mass estimates as a function of at least one pre-crash signal, at least one vehicle datum, the own vehicle speed, and at least one impact signal.

2 Claims, 1 Drawing Sheet

DEVICE FOR TRIGGERING A RESTRAINING SYSTEM IN A VEHICLE

FIELD OF THE INVENTION

The present invention relates to a device for triggering a restraining system in a vehicle.

BACKGROUND INFORMATION

A passenger protection system having a proximity sensory system is known from German Patent No. 198 18 586. In addition, at least one mass detection sensor for estimating the mass of the impact object is provided in the external contour of the vehicle. The mass detection sensor may be configured as a pressure difference sensor or as an acceleration sensor. Characteristic is that the mass detection sensor is movable away from the external contour toward the obstacle.

SUMMARY OF THE INVENTION

In contrast, the device of the present invention for triggering a restraining system in a vehicle has the advantage that typically available sensory system for a restraining system, i.e., the inertial sensor and the pre-crash sensor, as well as vehicle data and the speed of the own vehicle may be used to determine the mass of the impact object. This results in a significantly simpler solution entailing less production and development expenditure. In particular, this makes it possible to detect the accident situation more precisely and as such to better trigger the restraining means of the restraining system.

It is particularly advantageous that the pre-crash signal indicates the relative speed, the vehicle data provides the mass and stiffness of the vehicle, the speed signal, which was measured by a speed sensor and is available on the CAN bus of the vehicle for example, includes the speed of the own vehicle, and the impact signal is generated by an impact sensor. An acceleration sensor is preferably used as the impact sensor, the signal of which may be used to detect the crash type as a function of the impact speed. The crash type detection may then be used to determine the stiffness, which is needed for the mass estimate. This stiffness is the stiffness of the impact object.

DETAILED DESCRIPTION

The acceleration signal, which is measured by the central acceleration sensor or upfront sensor, is analyzed to determine the instantaneous impact speed, stiffness, as well as mass of the object impacting in a vehicle crash. These parameters are only able to be determined in combination in this context. The pre-crash sensory system allows the impact speed to be measured and to thus be used as an independent variable. As a result, only the two parameters, mass and stiffness, must still be determined in combination. These parameters are the parameters of the impact object. In accordance with the present invention, the mass of the impact object is determined as a value independent of the stiffness in order to be able to arrive at the decision to activate restraining means in a vehicle in a more precise, reliable, and situation-specific manner. The mass of the impact object is determined from the impact speed determined by the pre-crash sensory system and the vehicle data regarding the own vehicle. As a result, it is possible to record the accident situation more accurately and as such to better trigger the restraining means. These restraining means include airbags, belt pretensioners, and roll bars.

Figure 1:
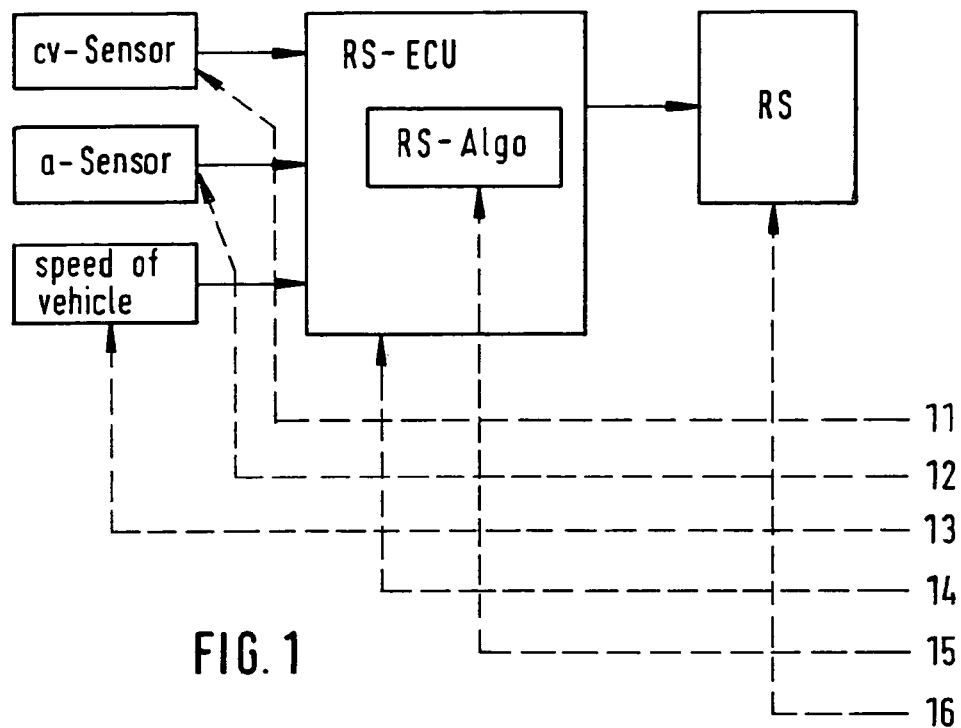
FIG. 1 shows a block diagram of the device of the present invention.

FIG. 1 shows a block diagram of the device of the present invention. An environment sensor 11 is connected via a first data input to a control unit 14. An acceleration sensor 12 is connected via a second data input to the control unit, and a sensor 13 for determining the own speed is connected via a third data input to the control unit. In this context, it is possible for example for the own speed to be available on the CAN bus and for the control unit to receive information regarding the own speed from there. Control unit 14 is assigned a processor 15, on which an algorithm for calculating the trigger times of a restraining means runs. It is possible for additional algorithms for triggering other restraining means to also be processed. Control unit 14 is connected via a data output to restraining means 16. Examples of these restraining means 16 include airbags, belt pretensioners, or a roll bar. Restraining means 16 may be triggered either by control unit 14 or by a further control unit for the restraining means. Only one environment sensor 11 and one acceleration sensor 12 are mentioned here as examples. However, more than one environment sensor and more than one acceleration sensor may be used. Environment sensor 11 may be a radar, ultrasound, or video sensor, for example. As a result, it is particularly possible to measure the speed of a detected object. The acceleration sensor is used as an impact sensor that determines the acceleration resulting from the impact.

Figure 2:
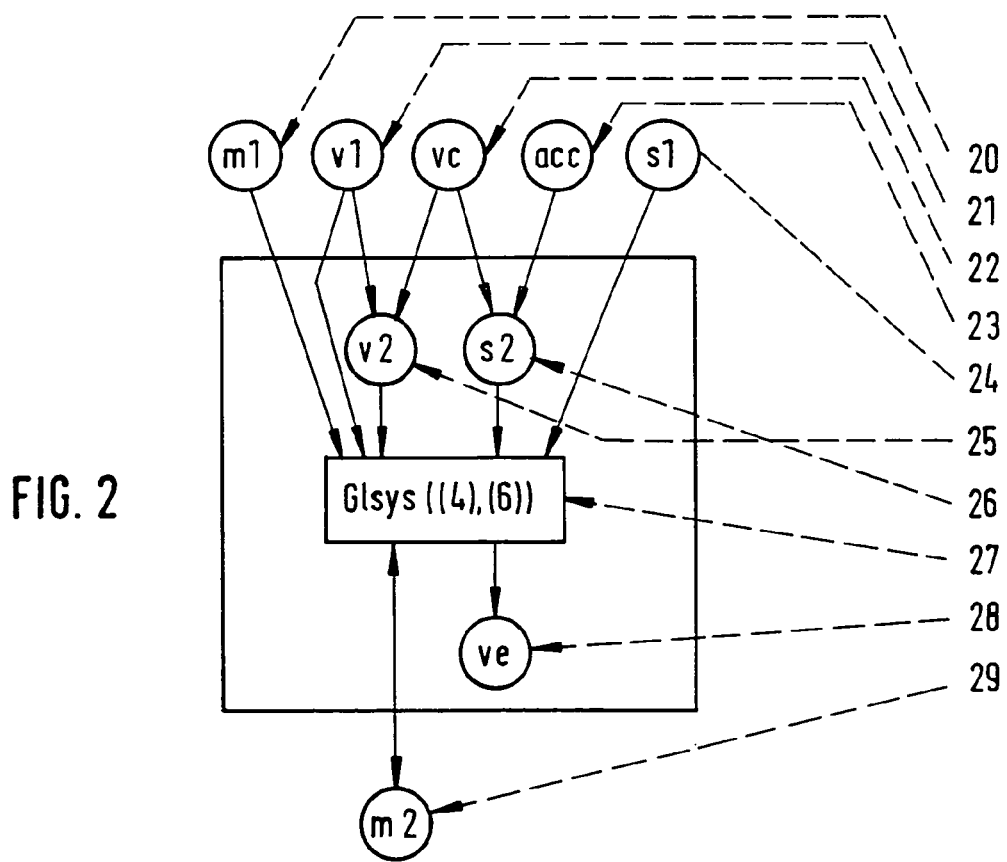
FIG. 2 shows a flow chart.

Algorithm 15, which runs in the control unit, is shown in FIG. 2 as a flow chart and is based in particular on the law of the impact of two bodies. Impulse and energy are conserved during impact. If subscript 1 designates vehicle 1, subscript 2 vehicle 2, the prime mark the value after impact, m the mass, v the speed, and $v_c$ the relative speed between the two vehicles, i.e., the impact speed, the following is true for the conservation of the impulse:

$$m_1 v_1 + m_2 v_2 = m_1 v'_1 + m_2 v'_2. \quad (1)$$

The course of a crash may be divided into two phases: the impact phase and braking phase. During the impact phase, significant deceleration values act on the occupants so that they must be protected by the restraining systems, while during the braking phase only low decelerations occur due to the friction and braking processes so that the occupants no longer require the protection of the restraining systems. In the case of a real crash, it may be assumed with sufficient accuracy that the speed of the two vehicles is equal at the end of the impact phase. If $v_e$ is the common end speed, the following is true:

$$v'_1 = v'_2 = v_e. \quad (2)$$

Since the impact speed equals the sum of the two own speeds, the following is true:

$$v_1 + v_2 = V_c. \quad (3)$$

Since $v_1$ is the own speed and $v_c$ is the impact speed measured by pre-crash sensor 11, both speeds are known to the control unit of vehicle 1. As a result, equation 3 may be used to calculate $v_2$. Replacing $v_2$ with the difference between $v_c$ and $v_1$ and inserting equation 2 in equation 1 yields the following:

$$m_1 v_1 + m_2(v_c - v_1) = (m_1 + m_2)V_e. \quad (4)$$

If $E_{reduced}$ is the reduced energy, the following is true for the energy balance prior to and following impact:

$$\frac{1}{2}m_1 v_1^2 + \frac{1}{2}m_2 v_2^2 = E_{reduced} + \frac{1}{2}m_1 v_1^2 + \frac{1}{2}m_2 v_2^2. \quad (5)$$

Inserting equation 2 in equation 5 and replacing $v_2$ with the difference between $v_c$ and $v_1$ yields:

$$\frac{1}{2}m_1 v_1^2 + \frac{1}{2}m_2(v_c - v_1)^2 = E_{reduced} + \frac{1}{2}(m_1 + m_2)v_e^2. \quad (6)$$

Under the precondition that $E_{reduced}$ is known, the two unknown values $m_2$ and $v_e$ are then able to be calculated using equations 4 and 6. The reduced energy is dependent on the impact speed, the mass, and the stiffness of the own vehicle and the impact object:

$$E_{reduced} = f(v_c, m_1, m_2, s_1, s_2). \quad (7)$$

If the opposing object as the impact object is firmly anchored in the ground, it corresponds with an infinite mass $m_2$. Values $v_c$, $m_1$, and $s_1$, respectively, are known in the control unit from the pre-crash sensor or the own vehicle data provided in a memory. Stiffness $s_2$ of the opposing object may be determined via crash type detection from the acceleration signal and the impact speed. As a result, all parameters are known except for $m_2$, and $m_2$ is able to be calculated by the system using equations 4 and 6.

FIG. 2 again shows that input values $m_1$ 20, $v_1$ 21, $v_c$ 22, acc 23, and $s_1$ 24 are connected to one another such that speed $v_2$ of the impact object is determined from $v_1$ 21 and $v_c$ 22. In this case, $v_2$ is provided with reference numeral 25. Stiffness $s_2$ of the impact object is determined from $v_c$ 22 and acc 23. In this instance, acc 23 designates the acceleration or a signal derived therefrom, e.g., the integrated acceleration. In block 27, equations 4 and 6 as well as values $m_1$, $v_1$, $v_2$, $s_2$, and $s_1$ are used to calculate the final speed, the $v_e$ of the two vehicles, as well as mass $m_2$ 29 of the impact object.

What is claimed is:

1. A device for triggering a restraining system in a vehicle, comprising:
    an arrangement for triggering the restraining system as a function of a mass estimate of an impact object; and
    an arrangement for performing the mass estimate as a function of at least one pre-crash signal, at least one vehicle datum, and at least one signal of an inertial sensory system;
    wherein the at least one vehicle datum includes a mass of the vehicle and a stiffness of the vehicle.

2. A device for triggering a restraining system in a vehicle, comprising:
    an arrangement for triggering the restraining system as a function of a mass estimate of an impact object; and
    an arrangement for performing the mass estimate as a function of at least one pre-crash signal, at least one vehicle datum, and at least one signal of an inertial sensory system;
    wherein a stiffness of the impact object is determined from an impact signal and an impact speed.

* * * * *